United States Patent
Walsh

(10) Patent No.: US 7,514,165 B2
(45) Date of Patent: Apr. 7, 2009

(54) FUEL CELL SYSTEM FLUID RECOVERY

(75) Inventor: Michael M. Walsh, Fairfield, CT (US)

(73) Assignee: Plug Power Inc., Latham, NY (US)

( * ) Notice: Subject to any disclaimer, the term of this patent is extended or adjusted under 35 U.S.C. 154(b) by 326 days.

(21) Appl. No.: 10/429,535

(22) Filed: May 5, 2003

(65) Prior Publication Data

US 2003/0198840 A1    Oct. 23, 2003

Related U.S. Application Data

(62) Division of application No. 09/629,537, filed on Jul. 31, 2000, now Pat. No. 6,558,826.

(51) Int. Cl.
*H01M 8/04* (2006.01)
(52) U.S. Cl. .............. 429/13; 429/17; 429/34
(58) Field of Classification Search ............. 429/13, 429/22, 34
See application file for complete search history.

(56) References Cited

U.S. PATENT DOCUMENTS

| | | | | |
|---|---|---|---|---|
| 4,037,024 A | * | 7/1977 | Landau ................ | 429/17 |
| 5,645,950 A | * | 7/1997 | Benz et al. ............ | 429/13 |
| 5,773,160 A | * | 6/1998 | Wilkinson et al. .... | 429/13 |
| 5,922,094 A | * | 7/1999 | Richards .............. | 55/355 |
| 6,183,895 B1 | * | 2/2001 | Kudo et al. ........... | 429/20 |
| 6,316,134 B1 | * | 11/2001 | Cownden et al. ...... | 429/19 |
| 6,479,177 B1 | * | 11/2002 | Roberts et al. ........ | 429/13 |
| 6,579,637 B1 | * | 6/2003 | Savage et al. ......... | 429/12 |

* cited by examiner

*Primary Examiner*—Patrick Ryan
*Assistant Examiner*—Tony Chuo
(74) *Attorney, Agent, or Firm*—Trop, Pruner & Hu, P.C.

(57) ABSTRACT

A system and method are provided for fluid collection within a fuel cell system. The fluid collection device includes a fluid collection container which has a gas inlet, a gas outlet, at least one fluid inlet, and a fluid outlet. The at least one fluid inlet allows condensate to enter the fluid collection container. A fluid is contained within the fluid collection container. The gas inlet allows a purge gas to enter the fluid collection container to substantially purge the atmosphere of the fluid collection container through the gas outlet.

5 Claims, 2 Drawing Sheets

FUEL CELL SYSTEM FLUID RECOVERY

This application is a divisional of prior Application Ser. No. 09/629,537, filed on Jul. 31, 2000 now U.S. Pat. No. 6,558,826.

TECHNICAL FIELD

This invention relates generally to fuel cells and, more particularly, to recovery of fluid for use by a fuel cell system.

BACKGROUND

Fuel cells electrochemically convert fuels and oxidants to electricity. A Proton Exchange Membrane (hereinafter "PEM") fuel cell converts the chemical energy of fuels such as hydrogen and oxidants such as air/oxygen directly into electrical energy. The PEM is a solid polymer electrolyte that permits the passage of protons (i.e., $H^+$ ions) from the "anode" side of a fuel cell to the "cathode" side of the fuel cell while preventing passage therethrough of reactant fluids (e.g., hydrogen and air/oxygen gases). The direction, from anode to cathode, of flow of protons serves as the basis for labeling an "anode" side and a "cathode" side of every layer in the fuel cell, and in the fuel cell assembly or stack.

In general, an individual PEM-type fuel cell may have multiple, generally transversely extending layers assembled in a longitudinal direction. In a typical fuel cell assembly or stack, all layers which extend to the periphery of the fuel cells have holes therethrough for alignment and formation of fluid manifolds that generally service fluids for the stack. Typically, gaskets seal these holes and cooperate with the longitudinal extents of the layers for completion of the fluid supply manifolds. As may be known in the art, some of the fluid supply manifolds distribute fuel (e.g., hydrogen) and oxidant (e.g., air/oxygen) to, and remove unused fuel and oxidant as well as product water from, fluid flow plates which serve as flow field plates of each fuel cell. Other fluid supply manifolds circulate coolant (e.g., water) for cooling the fuel cell.

In a typical PEM-type fuel cell, the membrane electrode assembly (hereinafter "MEA") is sandwiched between "anode" and "cathode" gas diffusion layers (hereinafter "GDLs") that can be formed from a resilient and conductive material such as carbon fabric or paper. The anode and cathode GDLs serve as electrochemical conductors between catalyzed sites of the PENI and the fuel (e.g., hydrogen) and oxidant (e.g., air/oxygen) which flow in respective "anode" and "cathode" flow channels of respective flow field plates.

A typical fuel cell system generates condensate water at various locations within the system. Therefore, condensate traps have generally been designed and located at these locations to aid in the collection of condensate. The condensate may be collected and stored in a condensate accumulation container for future use by the system.

Whereas, it may be undesirable to allow air to escape through the condensate traps, various arrangements have been designed to prevent air from escaping through the traps. For example, a needle and float arrangement may be utilized to allow condensate to escape when present, however the escape will be plugged when there is no condensate in the trap.

It has been found that undesirable gasses may accumulate in the condensate collection container. Such gasses may become entrained or dissolved in the condensate removed in the system. The gasses may build up in the condensate collection container and present a hazard to the system. For example, a flammable gas such as hydrogen may accumulate in the condensate collection container and present a safety hazard to the system.

SUMMARY

The present invention provides a method for recovering fluid from a fuel cell system. The method includes providing the fuel cell system with a fluid collection container. The fluid collection container has a gas inlet and a gas outlet. The method further includes collecting condensate from the fuel cell system then transporting the condensate to the fluid collection container. A purge gas is provided to the gas inlet, wherein the purge gas flows through the fluid collection container and exits through the gas outlet.

In another aspect, a method is provided for purging undesirable gas from a fluid container operating with a fuel cell system. The fluid container has an inlet and an outlet. The method includes providing a purge gas to the inlet. The purge gas flows through the fluid container and exits through the outlet.

In another aspect, a fluid collection system is provided for a fuel cell system. The fluid collection device includes a fluid collection container which has a gas inlet, a gas outlet, at least one fluid inlet, and a fluid outlet. The at least one fluid inlet allows condensate to enter the fluid collection container. A fluid is contained within the fluid collection container. An undesirable gas is also contained within the fluid collection container. The as inlet allows a purge gas to enter the fluid collection container to substantially purge the undesirable gas out of the fluid collection container through the gas outlet.

In another aspect, a method is provided for operating a fuel cell system. In general, water is separated from a reactant (process) stream and the water is collected in a collection or accumulation chamber. The atmosphere of the chamber is purged either continually or periodically. The water may be filtered to maintain a desired purity, and may be heated to generate water vapor (steam). The steam may be used, for example, to humidify a fuel processor inlet reactant stream to a desired steam to carbon ratio (3:1 for example). The steam to carbon ratio may be adjusted by adjusting the temperature of the humidified stream, by adjusting the amount of steam generated, and by metering the amount of steam introduced to the process stream (as examples). In some embodiments, the steam may be generated in a steam generator downstream from the fluid collection container (also referred to as an accumulation chamber). In other embodiments, the steam may be generated within the fluid collection container. In still other embodiments, the steam may be generated within the fluid collection container, and a fuel processor reactant gas may be used as the purge gas and be humidified by the steam. Other embodiments and features are possible and within the scope of the claims presented below.

BRIEF DESCRIPTION OF THE DRAWING

The subject matter that is regarded, as the invention is particularly pointed out and distinctly claimed in the claims at the conclusion of the specification. The foregoing and other features and advantages of the invention will be readily understood from the following detailed description of preferred embodiments taken in conjunction with the accompanying drawings in which:

DETAILED DESCRIPTION

Figure 1:
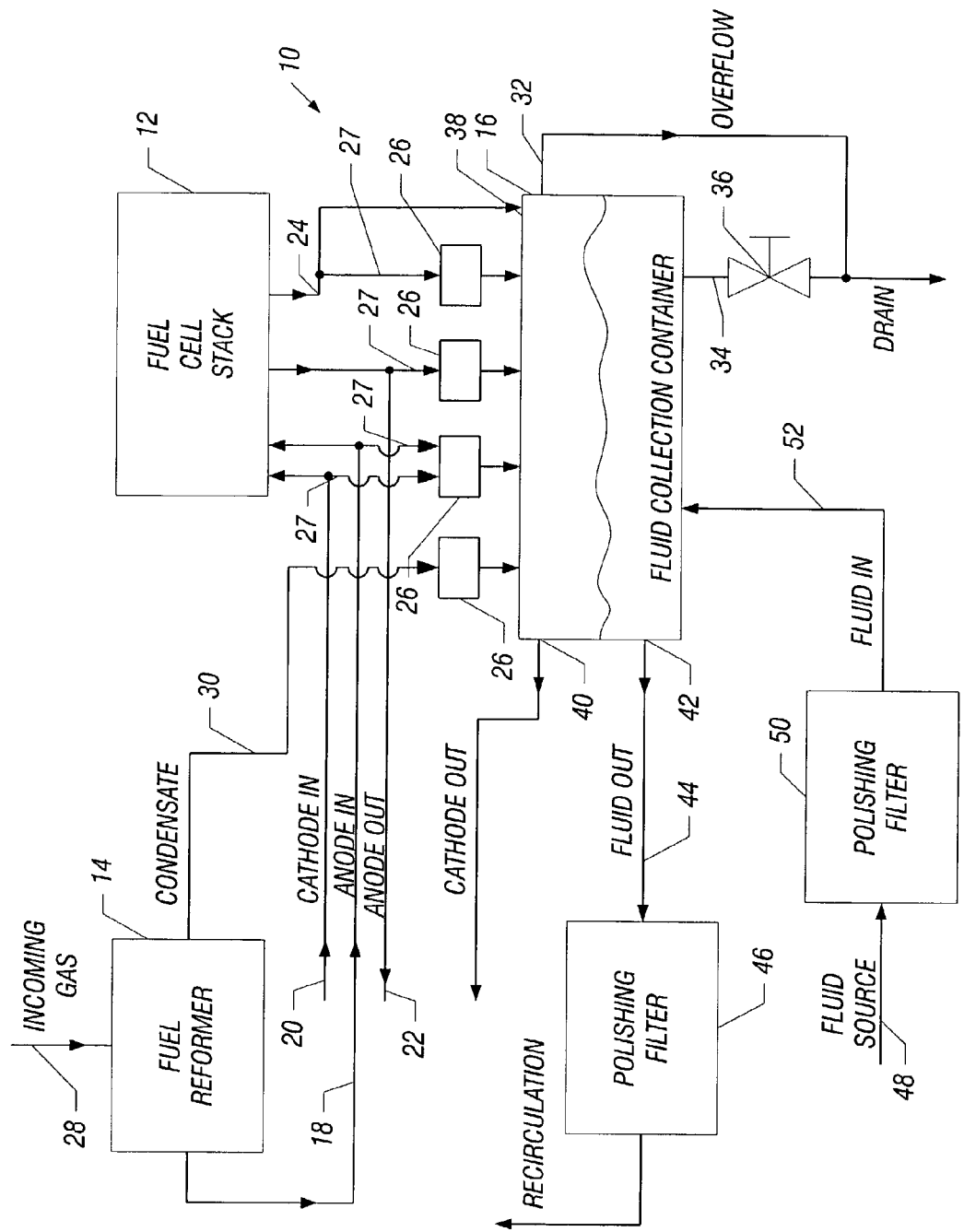
FIG. 1 is a schematic diagram depicting a fluid recovery system in accordance with an embodiment of the present invention.

Referring initially to FIG. 1 there is illustrated, in a schematic diagram, a fluid recovery system, generally referenced 10, that embodies the teachings of the present invention. Fluid recovery system 10 comprises a fuel cell stack 12, fuel reformer 14, and fluid collection container 16. Fuel cell stack 12 typically will include end plates and a working section therebetween (not shown). The working section may include one or more active sections and can include a selected number of cooling sections, as will be understood by those skilled in the art.

The working section includes a number of individual fuel cells (not shown) which generally form fluid manifolds for supplying reactant gas. or fluids to, removing fluids from, and otherwise communicating and/or servicing fluids as desired within the working section. An anode gas supply line 18 and a cathode gas supply line 20 supply the reactant gases necessary for operation of the fuel cell system. Supply lines 18 and 20 may comprise a plurality of individual lines for supplying reactant gases to fuel cell stack 12. Supply lines 18 and 20 may be preferably constructed from non-corrosive stainless-steel or polypropylene, or any other suitable material as may be known in the art.

In the context of this invention a reactant gas may be any substance which is classified as a fuel, such as substantially pure hydrogen, methanol reformate or natural gas reformate, or any substance classified as an oxidant such as substantially pure oxygen or oxygen containing air, as may be known in the art. Fuel cell stack 12 also preferably includes exhaust manifolds 22 and 24 for expelling unreacted fuel and oxidant gases.

A gas supply line 28 carries the incoming gas, such as methanol or methane, to fuel reformer 14. Fuel reformer14 produces and introduces as a fuel, such as substantially pure hydrogen, methanol reformate or natural gas reformate, into anode supply line 18, for use in fuel cell stack 12. During fuel reformation condensate or excess fluid may be present in fuel reformer 14, therefore the system may be equipped with a condensate return line 30. Condensate return line 30 transports condensate and/or fluid from fuel reformer 14 to fluid collection container 16.

Fluid collection container 16 may be constructed out of any suitable material, such as plastic or stainless steel. Those of skill in the art will appreciate that fluid collection container 16 may include traps 26 for collecting fluids condensing or accumulating in the system. Traps 26 are connected to various locations of the fuel cell system by fluid lines 27. Traps 26 may have a needle and float arrangement, whereby transport of gas through traps 26 is blocked when there is no fluid in the trap. When fluid is in the trap, a float allows the fluid to enter fluid collection container 16. Alternatively, any type of fluid trap may be used as is known in the art.

Fluid collection container 16 may also have an overflow 32 and a drain 34 to aid in controlling the level of the fluid residing within fluid collection container 16. Drain 34 may be operated by a valve 36 in communication with a level sensor (not shown) mounted within fluid collection container 16. It will be appreciated by those of skill in the art that fluid and/or condensate may be transported to fluid collection container 16 from any area of the fuel cell system which fluid and/or condensate may be present. Also, multiple fluid collection containers may be used in conjunction with one another to afford greater design flexibility to the system.

From time to time undesirable gas may become entrained or dissolved in the fluid being transported and ultimately reside in fluid collection container 16. Build up of any undesirable gas, such as hydrogen, may present a hazard to operation of the system. Undesirable gas may be liberated during operation of the fuel cell by introducing a purge gas, such as air, into fluid collection container 16. The purge gas enters fluid collection container 16 through inlet 38, and exits along with any undesirable gas through outlet 40. Inlet 38 and outlet 40 may comprise a valve capable of opening and closing depending on the operating conditions of the fuel cell system.

As is shown in FIG. 1, the cathode exhaust stream may be utilized to purge fluid collection container 16 from the accumulation of any undesirable gases. In some embodiments, this purge gas stream may then be sent to an oxidizer (not shown) such as a burner to remove any combustible gasses before the exhaust is vented to the atmosphere (as an example). Alternatively, outside air or a suitable purge gas from another source may be used to liberate any undesirable gas from fluid collection container 16.

The fluid collected in fluid collection container 16 may then be recirculated through the fuel cell system for use at various locations requiring such fluid. The fluid may exit fluid collection container 16 through an outlet 42 and into a fluid line 44 for recirculation. If the fluid collection container is collecting, for example, deionized water, purging the container may impart ions to the deionized water thereby rendering it conductive. Therefore, the fluid recovery system may have a polishing filter 46 connected to the recirculating fluid line. Polishing filter 46 may comprise a ResinTech filter model number mrn-1, for example, however any suitable polishing/scrubbing filter may be used as is known in the art.

At various times of operation, such as start up, fluid will be required to be added to fluid recovery system 10. When additional fluid is required to be added to the system, fluid may be added from a source 48 (i.e. home water supply line) and deionized by use of a polishing filter 50. Polishing filter 50 may be of similar construction to polishing filter 46 described herein. The fluid may then pass through fluid line 52 and into fluid collection container 16 for use by the system. In other embodiments, the fluid may not need to be filtered, or the degree of purity required may vary.

Figure 2:
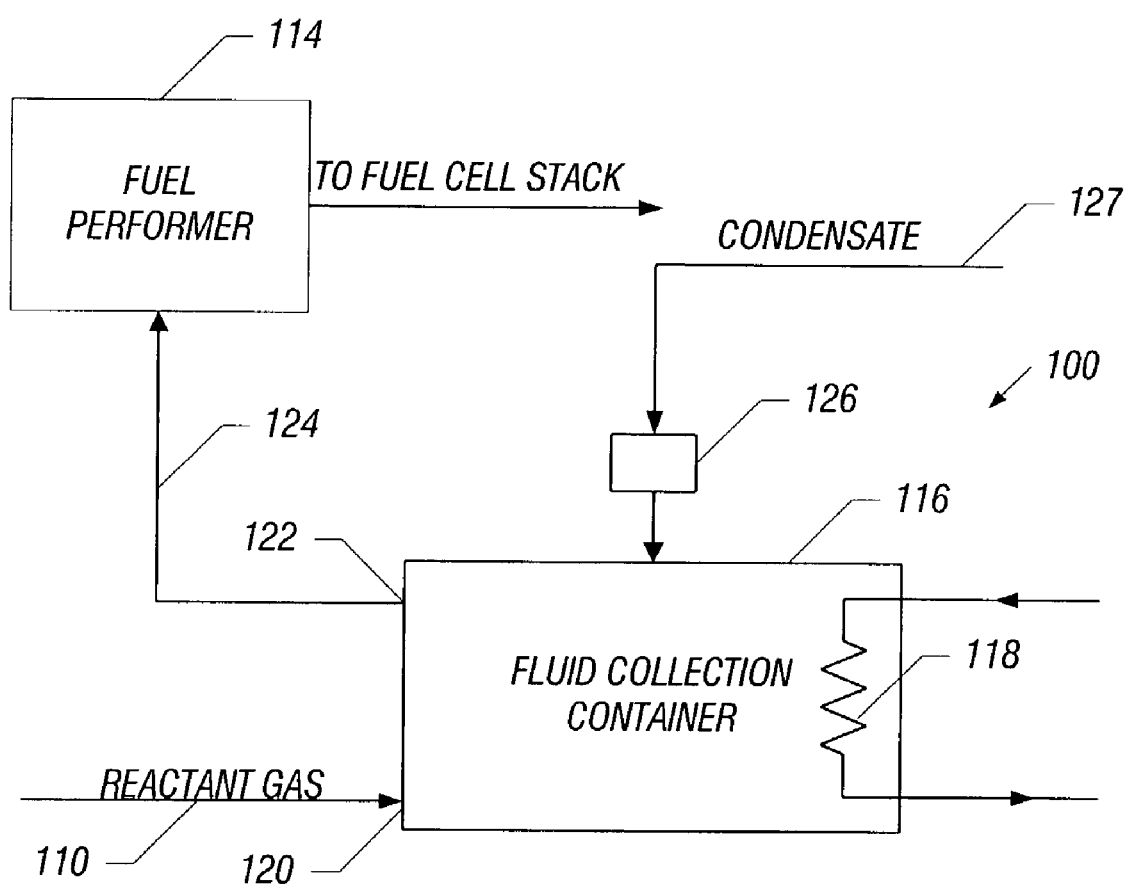
FIG. 2 is a schematic diagram depicting another embodiment of a fluid recovery. system in accordance with the present invention.

An alternate embodiment of a fluid recovery system is illustrated is FIG. 2, in schematic format. Fluid recovery system 100 comprises a fluid collection container 116, a fuel reformer 114, an incoming reactant gas stream 110, and a steam generator 118. In addition to the components depicted in FIG. 2, the present alternate embodiment may be utilized with a fuel cell system and contain components similar to those described with reference to FIG. 1.

As shown in FIG. 2, condensate is transported through fluid line 127 and is separated from the reactant gas streams by fluid trap 126. The fluid then enters fluid collection container 116. A reactant gas enters fluid collection container 116 through an inlet 120. A steam generator 118 heats the fluid contained within fluid collection container 116 to create steam. Steam generator may comprise a heat exchanger, which uses heated coolant from a fuel cell system to generate the steam. Alternatively, any type of steam generator may be utilized as is known in the art.

The humidified reactant gas then exits fluid collection container 116 through outlet 122, and is transported via fluid line 124 to fuel reformer 114. As will be appreciated by those of skill in the art, the particular fuel processing system that is used may dictate an optimal steam to carbon ratio, more than 2:1 for example, for a typical autothermal reforming system. The steam to carbon ratio refers to the ratio of water molecules to carbon atoms in the gas phase. In one embodiment, this ratio may be achieved by adjusting the temperature of the mixed fuel and steam (above 70° C. for example). In other embodiments, the ratio may also be achieved by adjusting the rate of steam generated or by metering a desired amount of steam into the stream.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for recovering fluid from a fuel cell system, said method comprising:
    providing said fuel cell system with a fluid collection container, said fluid collection container having a gas inlet and a gas outlet;
    routing a flow of the fuel cell system through a liquid trap seal to collect condensate from said fuel cell system, said liquid trap seal being separate from said fluid collection container;
    transporting said condensate from said liquid trap seal to said fluid collection container; and
    purging said fluid collection container, the purging comprising providing a cathode exhaust stream to said gas inlet, wherein said cathode exhaust stream flows through said fluid collection container and exits through said gas outlet.

2. The method of claim 1, wherein said condensate comprises deionized water.

3. The method of claim 2, further comprising filtering said condensate to remove ions and particulates imparted to said condensate from the cathode exhaust stream.

4. The method of claim 1, further comprising:
    transporting additional condensate from additional liquid trap seals to said fluid collection container, each of said additional traps being separate from said fluid collection container.

5. The method of claim 1, wherein the liquid trap seal comprises a needle and float to block communication of gas through the liquid trap seal when the seal does not contain fluid.

* * * * *